(12) United States Patent
Lee et al.

(10) Patent No.: US 11,840,588 B2
(45) Date of Patent: Dec. 12, 2023

(54) POLYOLEFIN RESIN AND PREPARATION METHOD THEREOF

(71) Applicant: DL Chemical CO., LTD., Seoul (KR)

(72) Inventors: Hee Jun Lee, Sejong-si (KR); Byung Keel Sohn, Daejeon (KR); Da Jung Kim, Daejeon (KR); Sung Ho Choi, Sejong-si (KR); Su Hyun Park, Daejeon (KR)

(73) Assignee: DL Chemical CO., LTD., Seoul (KR)

( * ) Notice: Subject to any disclaimer, the term of this patent is extended or adjusted under 35 U.S.C. 154(b) by 11 days.

(21) Appl. No.: 17/706,016

(22) Filed: Mar. 28, 2022

(65) Prior Publication Data

US 2022/0315679 A1 Oct. 6, 2022

(30) Foreign Application Priority Data

Mar. 29, 2021 (KR) .......... 10-2021-0040511

(51) Int. Cl.
  *C08F 210/16* (2006.01)
  *C08F 4/6592* (2006.01)
  *C08F 210/02* (2006.01)

(52) U.S. Cl.
  CPC .......... *C08F 210/02* (2013.01); *C08F 4/6592* (2013.01); *C08F 4/65927* (2013.01); *C08F 210/16* (2013.01)

(58) Field of Classification Search
  CPC ... C08F 210/16; C08F 4/6592; C08F 4/65927
  See application file for complete search history.

(56) References Cited

U.S. PATENT DOCUMENTS

| | | | |
|---|---|---|---|
| 4,461,873 A | 7/1984 | Bailey et al. | |
| 8,846,188 B2 | 9/2014 | Fantinel et al. | |
| 9,290,593 B2 | 3/2016 | Cho et al. | |
| 2003/0203809 A1* | 10/2003 | Kao | C08F 210/16 502/132 |
| 2016/0326282 A1* | 11/2016 | Wang | C08F 210/16 |
| 2019/0135960 A1* | 5/2019 | Kazemi | C08F 210/16 |

FOREIGN PATENT DOCUMENTS

| | | |
|---|---|---|
| EP | 1112293 B1 | 12/2005 |
| EP | 3292158 B1 | 8/2020 |
| JP | 3-281646 A | 12/1991 |
| JP | 2000-95809 A | 4/2000 |

(Continued)

OTHER PUBLICATIONS

Extended European Search Report dated Aug. 26, 2022 in Application No. 22164890.0.

(Continued)

*Primary Examiner* — Caixia Lu
(74) *Attorney, Agent, or Firm* — Sughrue Mion, PLLC (57) ABSTRACT

The present disclosure relates to a linear low-density polyethylene copolymer and a preparation method thereof. The linear low-density polyethylene copolymer has a long-chain branching (LCB) distribution similar to that of general metallocene polyethylene (mPE) and has good mechanical properties such as processability and toughness. Thus, the linear low-density polyethylene copolymer is useful for molding into shrinkage films, agricultural films, etc.

10 Claims, 2 Drawing Sheets

(56) References Cited

FOREIGN PATENT DOCUMENTS

| | | |
|---|---|---|
| JP | 2005-511804 A | 4/2005 |
| KR | 10-2004-0061926 A | 7/2004 |
| KR | 10-2006-0135660 A | 12/2006 |
| KR | 10-2015-0132398 A | 11/2015 |
| KR | 10-2116476 B1 | 5/2020 |
| RU | 2509782 C2 | 3/2014 |
| WO | 00/11047 A1 | 3/2000 |
| WO | 2016/178105 A1 | 11/2016 |
| WO | 2019/092525 A1 | 5/2019 |
| WO | 2019/241045 A1 | 12/2019 |

OTHER PUBLICATIONS

Translation of Communication dated Nov. 11, 2022 from the Russian Federal Service for Intellectual Property Office in Application No. 2022107810/04(016119).
Office Action dated Apr. 28, 2023 in Kazakhstan Application No. 2022/0179.1.
Office Action dated May 12, 2023 in Korean Application No. 10-2021-0040511.

* cited by examiner

POLYOLEFIN RESIN AND PREPARATION METHOD THEREOF

CROSS REFERENCE TO RELATED APPLICATION

The present application claims priority to Korean Patent Application No. 10-2021-0040511, filed Mar. 29, 2021, the entire contents of which is incorporated herein for all purposes by this reference.

BACKGROUND OF THE DISCLOSURE

1. Field of the Disclosure

The present disclosure relates to a polyolefin resin and a method of preparing the same. More particularly, the present disclosure relates to a linear low-density polyethylene copolymer having good processability and toughness, and a method of preparing the same.

2. Description of the Related Art

Linear low-density polyethylene (LLDPE) is a resin with a narrow molecular weight distribution and few long-chain branches (LCB), commonly prepared by copolymerization of ethylene and alpha-olefin (commercially, 1-butene, 1-hexene, and 1-octene are mainly used) at low pressure under the presence of a polymerization catalyst.

LLDPE is similar in density to low-density polyethylene (LDPE) prepared by the conventional high-pressure method but better in physical properties such as breaking strength, elongation (strain %), tear strength, and depart falling impact strength.

Accordingly, LLDPE is increasingly used in applications such as stretching films and overlapping films to which it is difficult to apply existing low-density polyethylene or high-density polyethylene (HDPE). In these applications, the film is required to have excellent processability, breaking strength, tear strength, depart falling impact strength, haze, and the like.

ZN-LLDPE prepared using the existing Ziegler-Natta catalyst is excellent in processability due to a broad molecular weight distribution but have deteriorated physical properties, whereas mLLDPE prepared using a metallocene catalyst having a single active site have good physical properties but exhibits poor processability due to a narrow molecular weight distribution.

In order to solve the problem of poor processability, research has been conducted to prepare a polyolefin having a broad molecular weight distribution or a multimodal molecular weight distribution.

One of the methods is a post-reactor technique or a melt blending method in which two or more polyolefins having different molecular weights are blended together before or during processing. For example, U.S. Pat. No. 4,461,873 discloses a method of physically blending polymers of two different physical properties to produce a bimodal polymeric blend.

Another method is to use a multistage reactor. The method uses two or more reactors. In a first reactor, a first polymer having one of two different molecular weight distributions is prepared under predetermined conditions, the first polymer is delivered to a second reactor, and in a second reactor, a second polymer having a different molecular weight distribution from the first polymer is prepared under conditions different from the reaction conditions in the first reactor.

On the other hand, LLDPE containing long-chain branches has been studied in order to achieve good bubble stability and low load during blown film processing. LLDPE with such long-chain branches is advantageous for processing because the side chains are entangled with each other in a form similar to LDPE. However, LLDPE containing too many long chain branches has a problem in that the toughness is low.

Accordingly, there is a need to develop a linear low-density polyethylene having excellent processability and excellent toughness due to the presence of long-chain branching.

DOCUMENTS OF RELATED ART

[Patent Document]
(Patent Document 1) U.S. Pat. No. 4,461,873 (Jul. 24, 1984)

SUMMARY OF THE DISCLOSURE

In order to solve the above problems, an objective of the present disclosure is to provide a polyolefin resin having good processability and toughness so as to be useful for molding into a shrinkage film, an agricultural film, etc., and a method of preparing the same.

However, the above objective is illustrative, and the technical spirit of the present disclosure is not limited thereto.

A first aspect of the present disclosure for achieving the above objective relates to a polyolefin resin satisfying Requirements (1) to (vii) below:

(i) the density (D) measured by a density gradient pipe method according to ASTM D1505 ranges from 0.900 to 0.936 g/cm$^3$;

(ii) the melt flow index (MIE) measured according to ASTM D1238 (190° C., 2.16 kg) ranges from 0.1 to 2.0 g/10 minutes;

(iii) the high load melt flow index (MIF) measured according to ASTM D1238 (190° C., 21.6 kg) ranges from 17 to 100 g/10 minutes;

(iv) the melt flow rate ratio (SR, MIF/MIE) ranges from 35 to 55;

(v) the ratio (Mw/Mn) of the weight average molecular weight (Mw) to the number average molecular weight (Mn) measured by gel permeation chromatography ranges from 3.0 to 5.0;

(vi) the ratio (Mz/Mw) of Z-average molecular weight (Mz) to weight average molecular weight (Mw) measured by gel permeation chromatography ranges from 2.0 to 3.5; and (vii) the tear strength (MD, g) in the machine direction of the film blown to a thickness of 30 μm under the condition of the expansion ratio (BUR) of 2.5 of the polyolefin resin satisfies Relational Equation 1 below.

$$MD > \frac{1}{EXP(0.102 \times SR)} \times 3000 + EXP\left(\frac{4.35}{D}\right) \quad \text{[Relational Equation 1]}$$

In addition, a second aspect of the present disclosure relates to a polyolefin film prepared by blowing the above-described polyolefin resin.

In addition, a third aspect of the present disclosure relates to a polyolefin preparation method including the steps of: a) synthesizing a pre-polymer by pre-polymerizing a pre-polymer composition including an ethylene monomer, an alpha olefin monomer having 3 or more carbon atoms, and a catalyst composition in a slurry polymerization reactor; and b) supplying a main polymerization composition including the pre-polymer, an ethylene monomer, and an alpha olefin monomer having 3 or more carbon atoms to a gas phase reactor and polymerizing the main polymerization composition into a polyolefin polymer, wherein the polyolefin polymer satisfies Requirements (i) to (vii).

In the third aspect, the pre-polymerization composition may include 80% to 99.9% by weight of the ethylene monomer and 0.1% to 20% by weight of the alpha olefin monomer having 3 or more carbon atoms, with respect to the total amount of the monomers.

In the third aspect, the catalyst composition may include one or more organometallic compounds represented by Formula 1 below.

[Chemical Formula 1]

(In Chemical Formula 1,

M is zirconium (Zr),

$L_1$ and $L_2$ are each independently cyclopentadienyl, indenyl, tetrahydro indenyl or fluordenyl, T is Al, Si, Sn, or a hydrocarbon group having 1 to 4 carbon atoms, $X_1$ and $X_2$ are each independently a halogen or a hydrocarbon group having 1 to 10 carbon atoms, and $L_1$, $L_2$, and T are each independently unsubstituted or further substituted with hydrogen, halogen, hydrocarbyl having 1 to 20 carbon atoms, alkoxy having 1 to 20 carbon atoms, or any combination thereof, in which substituents adjacent to each other are each independently linked to $L_1$ and $L_2$, thereby forming a fused ring structure.)

In the third aspect, the catalyst composition may include one or more aluminoxanes represented by Formulas 2 to 4 below.

[Chemical Formula 2]

[Chemical Formula 3]

[Chemical Formula 4]

(In Chemical Formulas 2, 3, and 4, $R_1$ to $R_4$ each independently represent a liner or branched alkyl group having 1 to 10 carbon atoms, X and y each independently are integers in the range of 1 to 50, and z is an integer in the range of 3 to 50.)

In the third aspect, the catalyst composition may include 1 to 100,000 moles of aluminoxane with respect to 1 mole of the organometallic compound.

In the third aspect, the catalyst composition may be in a form in which an organometallic compound and aluminoxane are supported on a carrier, and the carrier may be any one selected from the group consisting of silica, alumina, silica-alumina, clay, modified clay, and mixtures thereof.

In the third aspect, the catalyst composition includes, with respect to 100 parts by weight of the carrier, 5 to 30 parts by weight of aluminum derived from the aluminoxane compound and 0.01 to 1 parts by weight of zirconium derived from the organometallic compound. Preferably, with respect to 100 parts by weight of the carrier, the aluminum derived from the aluminoxane compound may be contained in an amount of 10 to 20 parts by weight, and the zirconium derived from the organometallic compound may be contained in an amount of 0.1 to 0.7 parts by weight.

The polyolefin resin according to the present disclosure may have excellent mechanical properties such as processability and toughness because the polyolefin resin satisfies Requirements (i) to (vii), and thus may be used in applications such as a shrinkage film, an agricultural film, and the like.

DESCRIPTION OF THE PREFERRED EMBODIMENTS

Hereinafter, a polyolefin resin and a preparation method thereof according to the present disclosure will be described in detail. The following drawings are provided as examples to sufficiently convey the spirit of the present disclosure to those skilled in the art. Accordingly, the present disclosure is not limited to the drawings and may be embodied in other forms, and the drawings presented below may be exaggerated to clarify the spirit of the present disclosure. In the flowing description, unless otherwise defined, all terms including technical and scientific terms used herein have the same meaning as commonly understood by those who are ordinarily skilled in the art to which this disclosure belongs. Further, when it is determined that the detailed description of the known art related to the present disclosure might obscure the gist of the present disclosure, the detailed description thereof will be omitted.

Terms such as first and second are used to describe a plurality of components and are used only for the purpose of distinguishing one component from other components. The terminology used herein is for the purpose of describing particular embodiments only and is not intended to be limiting. As used herein, the singular forms "a", "an", and "the" are intended to include the plural forms as well unless the context clearly indicates otherwise. It will be further understood that the terms "comprises", "includes", or "has" when used in the present disclosure specify the presence of stated features, regions, integers, steps, operations, elements and/or components, but do not preclude the presence or addition of one or more other features, regions, integers, steps, operations, elements, components and/or combinations thereof. The present disclosure may be embodied in many forms and may have various embodiments. Thus, specific embodiments will be illustrated and described in detail below. While specific embodiments of the disclosure will be described herein below, they are only illustrative purposes and should not be construed as limiting to the present disclosure. Accordingly, the present disclosure should be construed to cover not only the specific embodiments but also cover all modifications, equivalents, and substitutions that fall within the spirit and technical scope of the present disclosure.

A polyolefin resin according to one aspect of the present disclosure satisfies Requirements (i) to (vii) below:
(i) the density (D) measured by a density gradient pipe method according to ASTM D1505 ranges from 0.900 to 0.936 g/cm$^3$;
(ii) the melt flow index (MIE) measured according to ASTM D1238 (190° C., 2.16 kg) ranges from 0.1 to 2.0 g/10 minutes;
(iii) the high load melt flow index (MIF) measured according to ASTM D1238 (190° C., 21.6 kg) ranges from 17 to 100 g/10 minutes;
(iv) the melt flow rate ratio (SR, MIF/MIE) ranges from 35 to 55;
(v) the ratio (Mw/Mn) of the weight average molecular weight (Mw) to the number average molecular weight (Mn) measured by gel permeation chromatography ranges from 3.0 to 5.0;
(vi) the ratio (Mz/Mw) of Z-average molecular weight (Mz) to weight average molecular weight (Mw) measured by gel permeation chromatography ranges from 2.0 to 3.5; and
(vii) the tear strength (MD, g) in the machine direction of the film blown to a thickness of 30 μm under the condition of the expansion ratio (BUR) of 2.5 of the polyolefin resin satisfies Relational Equation 1 below.

$$MD > \frac{1}{EXP(0.102 \times SR)} \times 3000 + EXP\left(\frac{4.35}{D}\right)$$ [Relational Equation 1]

The polyolefin resin according to the present disclosure may have excellent mechanical properties such as processability and toughness because the polyolefin resin satisfies Requirements (i) to (vii), and thus may be used in applications such as a shrinkage film, an agricultural film, and the like.

Preferably, the polyolefin resin according to one example of the present disclosure may satisfy the conditions: (a) the density (D) measured by a density gradient pipe method according to ASTM D1505 ranges from 0.910 to 0.935 g/cm$^3$; (ii) the melt flow index (MIE) measured according to ASTM D1238 (190° C., 2.16 kg) ranges from 0.2 to 1.5 g/10 minutes; (iii) the high load melt flow index (MIF) measured according to ASTM D1238 (190° C., 21.6 kg) ranges from 17 to 50 g/10 minutes; and (iv) the melt flow rate ratio (SR, MIF/MIE) ranges from 38 to 50.

More preferably, the polyolefin resin according to one example of the present disclosure may satisfy the conditions: (a) the density (D) measured by a density gradient pipe method according to ASTM D1505 ranges from 0.915 to 0.933 g/cm$^3$; (ii) the melt flow index (MIE) measured according to ASTM D1238 (190° C., 2.16 kg) ranges from 0.3 to 1 g/10 minutes; (iii) the high load melt flow index (MIF) measured according to ASTM D1238 (190° C., 21.6 kg) ranges from 17 to 35 g/10 minutes; and (iv) the melt flow rate ratio (SR, MIF/MIE) ranges from 40 to 50. In addition, the polyolefin resin may satisfy the conditions: (v) the ratio (Mw/Mn) of the weight average molecular weight (Mw) to the number average molecular weight (Mn) measured by gel permeation chromatography ranges from 3.2 to 4.5; and (vi) the ratio (Mz/Mw) of Z-average molecular weight (Mz) to weight average molecular weight (Mw) measured by gel permeation chromatography ranges from 2.3 to 3.0.

The polyolefin resin that satisfies these conditions has low melt elasticity, so the relaxation time of the polyolefin resin can be shortened in a polymer melting step. Due to the short relaxation time, the polyolefin resin can have random orientation in the polymer melting step. When the polyolefin resin has the random orientation, the chains are oriented in various directions aside from the machine direction, the crack path in the machine direction is blocked. Thus, the tear strength (MD) in the machine direction increases, resulting in improvement in toughness.

In addition, since the polyolefin has high transparency despite having a high melt flow ratio (SR), the polyolefin can be very useful for agricultural and shrinkage film applications. On the other hand, when the melt flow index (MIE) or the melt flow index ratio (SR) is smaller than the lower limit of the corresponding range described above, processability is reduced. When low-density polyethylene (LDPE) is mixed to improve processability, processability is improved but mechanical properties are deteriorated.

On the other hand, the polyolefin resin according to one embodiment of the present disclosure may be a homopolymer obtained by polymerization of ethylene which is an olefinic monomer, or a copolymer obtained by copolymerization of ethylene and alpha olefin. In this case, the alpha olefin monomer serving as a comonomer may be an alpha olefin having 3 or more carbon atoms. Specifically, the alpha olefin having 3 or more carbon atoms may be one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene, and 1-eicosene. The use of an alpha olefin having 3 to 8 carbon atoms as a comonomer is preferable for polymerization to produce the polyolefin resins satisfying the above requirements.

In addition, a polyolefin film according to another aspect of the present disclosure relates to a polyolefin film prepared by blow-processing of the above-described polyolefin resin. The polyolefin film may be characterized in that it satisfies the following Relational Equation 1.

$$MD > \frac{1}{EXP(0.102 \times SR)} \times 3000 + EXP\left(\frac{4.35}{D}\right)$$ [Relational Equation 1]

(in Relational Equation 1, MD is the tear strength (g) in the machine direction of a polyolefin film blown to a thickness of 30 μm under the condition of an expansion ratio (BUR) of 2.5, D is the density measured by the density gradient pipe method according to ASTM D1505 (g/cm$^3$), and SR is the melt flow rate ratio (SR, MIF/MIE).)

Relational Equation 1 is an equation representing a correlation between the melt flow rate ratio (SR), the density (D), and the tear strength (MD). The olefin resins satisfying Relational Equation 1 exhibit higher tear strength (MD) and better processability than polyolefin resins having the same melt flow rate ratio (SR) and density (D) but not satisfying Relational Equation 1.

The polyolefin resin according to the present disclosure has a shorter relaxation time in a polymer melt step due to lower melt elasticity thereof. Due to the shorter relaxation time, can be shortened in a polymer melting step. As the relaxation time is shortened, the polyolefin resin can have random orientation in the polymer melting step. When the polyolefin resin has the random orientation, the chains are oriented in various directions aside from the machine direction, the crack path in the machine direction is blocked. Thus, the tear strength (MD) in the machine direction increases, resulting in improvement in toughness.

In this case, the polyolefin resin and the polyolefin film may satisfy Requirements (i) to (vii) described above. To avoid redundancy, the same descriptions will be omitted.

In addition, a further aspect of the present disclosure relates to a polyolefin preparation method including the steps of: a) synthesizing a pre-polymer by pre-polymerizing a pre-polymer composition including an ethylene monomer, an alpha olefin monomer having 3 or more carbon atoms, and a catalyst composition in a slurry polymerization reactor; and b) supplying a main polymerization composition including the pre-polymer, an ethylene monomer, and an alpha olefin monomer having 3 or more carbon atoms to a gas phase reactor and polymerizing the main polymerization composition into a polyolefin polymer, in which the polyolefin polymer satisfies Requirements (i) to (vii).

As such, the polyolefin resin is prepared by first synthesizing the pre-polymer in the slurry polymerization reactor and then performing the main polymerization in the gas phase reactor. Therefore, a polymer having higher density and lower molecular weight and a polymer having lower density and higher molecular weight are prepared in the respective reaction steps, resulting in a polymer having three or more molecular weight (Mw/Mn) distributions and many long-chain branches. That is, the polymer having good processability can be produced.

First, a) a pre-polymerization step is performed in a slurry polymerization reactor. In this step, a pre-polymer composition composed of an ethylene monomer, an alpha olefin monomer having 3 or more carbon atoms, and a catalyst composition is polymerized into a pre-polymer.

In one embodiment of the present disclosure, the pre-polymer composition may include 80% to 99.9 wt % of an ethylene monomer and 0.1% to 20 wt % of an alpha olefin monomer having 3 or more carbon atoms, preferably 82% to 99.5 wt % of an ethylene monomer and 0.5% to 18% by weight of an alpha olefin monomer having 3 or more carbon atoms, and more preferably, 85% to 97% by weight of an ethylene monomer and 3% to 15% by weight of an alpha olefin monomer having 3 or more carbon atoms. As the alpha olefin monomer as a comonomer, the alpha olefin having 3 or more carbon atoms may be used. Specific examples of the alpha olefin monomer having 3 or more carbon atoms may be one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene, and 1-eicosene. The use of the alpha olefin having 3 to 8 carbon atoms as the comonomer is preferable for polymerization to produce the polyolefin resins satisfying Requirements (i) to (vii).

As the catalyst composition according to one embodiment of the present disclosure, any catalyst composition can be used without particular limitation if the catalyst composition contains a catalyst component commonly used for polymerization of an ethylene polymer. Specific examples of the catalyst composition include an organometallic compound and aluminoxane. The catalyst composition may be used in the form in which the catalyst is supported on a porous carrier if necessary.

In one example of the present disclosure, the organometallic compound may include a metallocene catalyst component. Particularly, it is desirable to use a catalyst species generating a copolymer that exhibits excellent comonomer reactivity, generates many long chain branches (LCB), and has a wide molecular weight distribution enabling good processability and mechanical properties. Specifically, it is preferable to use at least one organometallic compound represented by Chemical Formula 1 below.

[Chemical Formula 1]

In Chemical Formula 1,

M is zirconium (Zr), $L_1$ and $L_2$ are each independently cyclopentadienyl, indenyl, tetrahydro indenyl or fluordenyl, T is Al, Si, Sn, or a hydrocarbon group having 1 to 4 carbon atoms, $X_1$ and $X_2$ are each independently a halogen or a hydrocarbon group having 1 to 10 carbon atoms, and $L_1$, $L_2$, and T are each independently unsubstituted or further substituted with hydrogen, halogen, hydrocarbyl having 1 to 20 carbon atoms, alkoxy having 1 to 20 carbon atoms, or any combination thereof, in which substituents adjacent to each other are each independently linked to $L_1$ and $L_2$, thereby forming a fused ring structure.

In the description of the present application, the term "hydrocarbyl" as used herein is a hydrocarbon group consisting of hydrogen and carbon and may refer to linear or branched alkyl, cycloalkyl, aryl, alkyl aryl, arylalkyl, or a combination thereof. For example, the hydrocarbyl may be methyl, ethyl, propyl, butyl, amyl, isoamyl, hexyl, isobutyl, heptyl, octyl, nonyl, decyl, cetyl, 2-ethylhexyl, or phenyl. The term "halogen" may refer to F, Cl, Br, or I, and the term "alkoxy" may refer to methoxy, ethoxy, propoxy, butoxy, or amyloxy. In addition, the expression that the substituents are independently connected to $L_1$ and $L_2$ to form a fused ring structure means, for instance, that hydrocarbon groups substituting for cyclopentadienyl groups are connected to each other to form a ring form such as tetrahydro indenyl.

Specifically, the organometallic compound may be any one or a combination of at least two selected from the group consisting of dimethylsilyl-bis(cyclopentadienyl) zirconium dichloride, dimethylsilyl-bis(methylcyclopentadienyl) zirconium dichloride, dimethylsilyl-bis(dimethylcyclopentadienyl) zirconium dichloride, dimethylsilyl-bis(trimethylcyclopentadienyl) zirconium dichloride, dimethylsilyl-bis (tetramethylcyclopentadienyl) zirconium dichloride, dimethylsilyl-bis(methyl,ethylcyclopentadienyl) zirconium dichloride, dimethylsilyl-bis(diethylcyclopentadienyl) zirconium dichloride, dimethylsilyl-bis(methyl,propylcyclopentadienyl) zirconium dichloride, dimethylsilyl-bis(tetrahydroindenyl) zirconium dichloride, dimethylsilyl-bis (indenyl) zirconium dichloride, dimethylsilyl-bis (methylindenyl) zirconium dichloride, dimethylsilyl-bis (ethylindenyl) zirconium dichloride, dimethylsilyl-bis(methyl,ethylindenyl) zirconium dichloride, dimethylsilyl-bis(methyl,propylindenyl) zirconium dichloride, dimethylsilyl-bis(methyl,butylindenyl) zirconium dichloride, dimethylsilyl-bis(propylindenyl) zirconium dichloride, dimethylsilyl-bis(butylindenyl) zirconium dichloride, dimethylsilyl-bis(isobutylindenyl) zirconium dichloride, dimethylsilyl-bis(phenylindenyl) zirconium dichloride, dimethylsilyl-bis(cyclopentadienyl) zirconium difluoride, dimethylsilyl-bis(methylcyclopentadienyl) zirconium difluoride, dimethylsilyl-bis(dimethylcyclopentadienyl) zirconium difluoride, dimethylsilyl-bis(trimethylcyclopentadienyl) zirconium difluoride, dimethylsilyl-bis(tetramethylcyclopentadienyl) zirconium difluoride, dimethylsilyl-bis(methyl,ethylcyclopentadienyl) zirconium difluoride, dimethylsilyl-bis(diethylcyclopentadienyl) zirconium difluoride, dimethylsilyl-bis(methyl,propylcyclopentadienyl) zirconium difluoride, dimethylsilyl-bis(tetrahydroindenyl) zirconium difluoride, dimethylsilyl-bis(indenyl) zirconium difluoride, dimethylsilyl-bis(methylindenyl) zirconium difluoride, dimethylsilyl-bis(ethylindenyl) zirconium difluoride, dimethylsilyl-bis(methyl,ethylindenyl) zirconium difluoride, dimethylsilyl-bis(methyl,propylindenyl) zirconium difluoride, dimethyl Silyl-bis(methyl,butylindenyl) zirconium difluoride, dimethylsilyl-bis(propylindenyl) zirconium difluoride, dimethylsilyl-bis(butylindenyl) zirconium difluoride, dimethylsilyl-bis(isobutylindenyl) zirconium difluoride, dimethylsilyl-bis(phenylindenyl) zirconium difluoride, dimethylsilyl-bis(cyclopentadienyl) zirconium dibromide, dimethylsilyl-bis(methylcyclopentadienyl) zirconium dibromide, dimethylsilyl-bis(dimethylcyclopentadienyl) zirconium dibromide, dimethylsilyl-bis(trimethylcyclopentadienyl) zirconium dibromide, dimethylsilyl-bis(tetramethylcyclopentadienyl) zirconium dibromide, dimethylsilyl-bis(methyl,ethylcyclopentadienyl) zirconium dibromide, dimethylsilyl-bis(diethylcyclopentadienyl) zirconium dibromide, dimethylsilyl-bis(methyl,propylcyclopentadienyl) zirconium dibromide, dimethylsilyl-bis(tetrahydroindenyl) zirconium dibromide, dimethylsilyl-bis(indenyl) zirconium dibromide, dimethylsilyl-bis(methylindenyl) zirconium dibromide, dimethylsilyl-bis(ethylindenyl) zirconium dibromide, dimethylsilyl-bis(methyl,ethylindenyl) zirconium dibromide, dimethylsilyl-bis(methyl,propylindenyl) zirconium dibromide, dimethylsilyl-bis(methyl,butylindenyl) zirconium dibromide, dimethylsilyl-bis(propylindenyl) zirconium dibromide, dimethylsilyl-bis(butylindenyl) zirconium dibromide, dimethylsilyl-bis(isobutylindenyl) zirconium dibromide, dimethylsilyl-bis(phenylindenyl) zirconium dibromide, dimethylsilyl-bis(cyclopentadienyl) zirconium diiodide, dimethylsilyl-bis(methylcyclopentadienyl) zirconium diiodide, dimethylsilyl-bis(dimethylcyclopentadienyl) zirconium diiodide, dimethylsilyl-bis(trimethylcyclopentadienyl) zirconium diiodide, dimethylsilyl-bis(tetramethylcyclopentadienyl) zirconium diiodide, dimethylsilyl-bis(methyl,ethylcyclopentadienyl) zirconium diiodide, dimethylsilyl-bis(diethylcyclopentadienyl) zirconium diiodide, dimethylsilyl-bis(methyl,propylcyclopentadienyl) zirconium diiodide, dimethylsilyl-bis(tetrahydroindenyl) zirconium diiodide, dimethylsilyl-bis(indenyl) zirconium diiodide, dimethylsilyl-bis(methylindenyl) zirconium diiodide, dimethylsilyl-bis(ethylindenyl) zirconium diiodide, dimethylsilyl-bis(methyl,ethylindenyl) zirconium diiodide, dimethylsilyl-bis(methyl,propylindenyl) zirconium diiodide, dimethylsilyl-bis(methyl,butylindenyl) zirconium diiodide, dimethylsilyl-bis(propylindenyl) zirconium diiodide, dimethylsilyl-bis(butylindenyl) zirconium diiodide, dimethylsilyl-bis(isobutylindenyl) zirconium diiodide, dimethylsilyl-bis(phenylindenyl) zirconium diiodide, diethylsilyl-bis(cyclopentadienyl) zirconium dichloride, diethylsilyl-bis(methylcyclopentadienyl) zirconium dichloride, diethylsilyl-bis(dimethylcyclopentadienyl) zirconium dichloride, diethylsilyl-bis(trimethylcyclopentadienyl) zirconium dichloride, diethylsilyl-bis(tetramethylcyclopentadienyl) zirconium dichloride, diethylsilyl-bis(methyl,ethylcyclopentadienyl) zirconium dichloride, diethylsilyl-bis(diethylcyclopentadienyl) zirconium dichloride, diethylsilyl-bis(methyl,propylcyclopentadienyl) zirconium dichloride, diethylsilyl-bis(tetrahydroindenyl) zirconium dichloride, diethylsilyl-bis(indenyl) zirconium dichloride, diethylsilyl-bis(methylindenyl) zirconium dichloride, diethylsilyl-bis(ethylindenyl) zirconium dichloride, diethylsilyl-bis(methyl,ethylindenyl) zirconium dichloride, diethylsilyl-bis(methyl,propylindenyl) zirconium dichloride, diethylsilyl-bis(methyl,butylindenyl) zirconium dichloride, diethylsilyl-bis(propylindenyl) zirconium dichloride, diethylsilyl-bis(butylindenyl) zirconium dichloride, diethylsilyl-bis(isobutylindenyl) zirconium dichloride, diethylsilyl-bis(phenylindenyl) zirconium dichloride, diethylsilyl-bis(cyclopentadienyl) zirconium difluoride, diethylsilyl-bis(methylcyclopentadienyl) zirconium difluoride, diethylsilyl-bis(dimethylcyclopentadienyl) zirconium difluoride, diethylsilyl-bis(trimethylcyclopentadienyl) zirconium difluoride, diethylsilyl-bis(tetramethylcyclopentadienyl) zirconium difluoride, diethylsilyl-bis(methyl,ethylcyclopentadienyl) zirconium difluoride, diethylsilyl-bis(diethylcyclopentadienyl) zirconium difluoride, diethylsilyl-bis(methyl,propylcyclopentadienyl) zirconium difluoride, diethylsilyl-bis(tetrahydroindenyl) zirconium difluoride, diethylsilyl-bis(indenyl) zirconium difluoride, diethylsilyl-bis(methylindenyl) zirconium difluoride, diethylsilyl-bis(ethylindenyl) zirconium difluoride, diethylsilyl-bis(methyl,ethylindenyl) zirconium difluoride, diethylsilyl-bis(methyl,propylindenyl) zirconium difluoride, diethylsilyl-bis(methyl,butylindenyl) zirconium difluoride, diethylsilyl-bis(propylindenyl) zirconium difluoride, diethylsilyl-bis(butylindenyl) zirconium difluoride, diethylsilyl-bis(isobutylindenyl) zirconium difluoride, diethylsilyl-bis(phenylindenyl) zirconium difluoride, diethylsilyl-bis(cyclopentadienyl) zirconium dibromide, diethylsilyl-bis(methylcyclopentadienyl) zirconium dibromide, diethylsilyl-bis(dimethylcyclopentadienyl) zirconium dibromide, diethylsilyl-bis(trimethylcyclopentadienyl) zirconium dibromide, diethylsilyl-bis(tetramethylcyclopentadienyl) zirconium dibromide, diethylsilyl-bis(methyl,ethylcyclopentadienyl) zirconium dibromide, diethylsilyl-bis(diethylcyclopentadienyl) zirconium dibromide, diethylsilyl-bis(methyl,propylcyclopentadienyl) zirconium dibromide, diethylsilyl-bis(tetrahydroindenyl) zirconium dibromide, diethylsilyl-bis(indenyl) zirconium dibromide, diethylsilyl-bis(methylindenyl) zirconium dibromide, diethylsilyl-bis(ethylindenyl) zirconium dibromide, diethylsilyl-bis(methyl,ethylindenyl) zirconium dibromide, diethylsilyl-bis(methyl,propylindenyl) zirconium dibromide, diethylsilyl-bis(methyl,butylindenyl) zirconium dibromide, diethylsilyl-bis(propylindenyl) zirconium dibromide, diethylsilyl-bis(butylindenyl) zirconium dibromide, diethylsilyl-bis(isobutylindenyl) zirconium dibromide, diethylsilyl-bis(phenylindenyl) zirconium dibromide, diethylsilyl-bis(cyclopentadienyl) zirconium diiodide, diethylsilyl-bis(methylcyclopentadienyl) zirconium diiodide, diethylsilyl-bis(dimethylcyclopentadienyl) zirconium diiodide, diethylsilyl-bis(trimethylcyclopentadienyl) zirconium diiodide, diethylsilyl-bis(tetramethylcyclopentadienyl)zirco- nium diiodide, diethylsilyl-bis(methyl,ethylcyclopentadienyl) zirconium diiodide, diethylsilyl-bis(diethylcyclopentadienyl) zirconium diiodide, diethylsilyl-bis(methyl, propylcyclopentadienyl) zirconium diiodide, diethylsilyl-bis(tetrahydroindenyl) zirconium diiodide, diethylsilyl-bis(indenyl) zirconium diiodide, diethylsilyl-bis(methylindenyl) zirconium diiodide, diethylsilyl-bis(ethylindenyl) zirconium diiodide, diethylsilyl-bis(methyl,ethyl indenyl) zirconium diiodide, diethylsilyl-bis(methyl,propyl indenyl) zirconium diiodide, diethylsilyl-bis(methyl,butyl indenyl) zirconium diiodide, diethylsilyl-bis(propyl indenyl) zirconium diiodide, diethylsilyl-bis(butylindenyl) zirconium diiodide, diethylsilyl-bis(isobutylindenyl) zirconium diiodide, diethylsilyl-bis(phenylindenyl) zirconium diiodide, ethylene-bis(cyclopentadienyl) zirconium dichloride, ethylene-bis(methylcyclopentadienyl) zirconium dichloride, ethylene-bis(dimethylcyclopentadienyl) zirconium dichloride, ethylene-bis(trimethylcyclopentadienyl) zirconium dichloride, ethylene-bis(tetramethylcyclopentadienyl) zirconium dichloride, ethylene-bis(methyl,ethylcyclopentadienyl) zirconium dichloride, ethylene-bis(diethylcyclopentadienyl) zirconium dichloride, ethylene-bis(methyl,propylcyclopentadienyl) zirconium dichloride, ethylene-bis(tetrahydroindenyl) zirconium dichloride, ethylene-bis(indenyl) zirconium dichloride, ethylene-bis(methylindenyl) zirconium dichloride, ethylene-bis(ethylindenyl) zirconium dichloride, ethylene-bis(methyl,ethylindenyl) zirconium dichloride, ethylene-bis(methyl,propylindenyl) zirconium dichloride, ethylene-bis(methyl,butylindenyl) zirconium dichloride, ethylene-bis(propylindenyl) zirconium dichloride, ethylene-bis(butylindenyl) zirconium dichloride, ethylene-bis(isobutylindenyl) zirconium dichloride, ethylene-bis(phenylindenyl) zirconium dichloride, ethylene-bis(cyclopentadienyl) zirconium difluoride, ethylene-bis(methylcyclopentadienyl) zirconium difluoride, ethylene-bis(dimethylcyclopentadienyl) zirconium difluoride, ethylene-bis(trimethylcyclopentadienyl) zirconium difluoride, ethylene-bis(tetramethylcyclopentadienyl) zirconium difluoride, ethylene-bis(methyl,ethylcyclopentadienyl) zirconium difluoride, ethylene-bis(diethylcyclopentadienyl) zirconium difluoride, ethylene-bis(methyl, propylcyclopentadienyl) zirconium difluoride, ethylene-bis(tetrahydroindenyl) zirconium difluoride, ethylene-bis(indenyl) zirconium difluoride, ethylene-bis(methylindenyl) zirconium difluoride, ethylene-bis(ethylindenyl) zirconium difluoride, ethylene-bis(methyl,ethylindenyl) difluoride, ethylene-bis(methyl,propylindenyl) zirconium difluoride, ethylene-bis(methyl,butylindenyl) zirconium difluoride, ethylene-bis(propylindenyl) zirconium difluoride, ethylene-bis(butylindenyl) zirconium difluoride, ethylene-bis(isobutylindenyl) zirconium difluoride, ethylene-bis(phenylindenyl) zirconium difluoride, ethylene-bis(cyclopentadienyl) zirconium dibromide, ethylene-bis(methylcyclopentadienyl) zirconium dibromide, ethylene-bis(dimethylcyclopentadienyl) zirconium dibromide, ethylene-bis(trimethylcyclopentadienyl) zirconium dibromide, ethylene-bis(tetramethylcyclopentadienyl) zirconium dibromide, ethylene-bis(methyl,ethylcyclopentadienyl) zirconium dibromide, ethylene-bis(diethylcyclopentadienyl) zirconium dibromide, ethylene-bis(methyl,propylcyclopentadienyl) zirconium dibromide, ethylene-bis(tetrahydroindenyl) zirconium dibromide, ethylene-bis(indenyl) zirconium dibromide, ethylene-bis(methylindenyl) zirconium dibromide, ethylene-bis(ethylindenyl) zirconium dibromide, ethylene-bis(methyl,ethylindenyl) zirconium dibromide, ethylene-bis(methyl,propylindenyl) zirconium dibromide, ethylene-bis(methyl,butylindenyl) zirconium dibromide, ethylene-bis(propylindenyl) zirconium dibromide, ethylene-bis(butylindenyl) zirconium dibromide, ethylene-bis(isobutylindenyl) zirconium dibromide, ethylene-bis(phenylindenyl) zirconium dibromide, ethylene-bis(cyclopentadienyl) zirconium diiodide, ethylene-bis(methylcyclopentadienyl) zirconium diiodide, ethylene-bis(dimethylcyclopentadienyl) zirconium diiodide, ethylene-bis(trimethylcyclopentadienyl) zirconium diiodide, ethylene-bis(tetramethylcyclopentadienyl) zirconium diiodide, ethylene-bis(methyl,ethylcyclopentadienyl) zirconium diiodide, ethylene-bis(diethylcyclopentadienyl) zirconium diiodide, ethylene-bis(methyl,propylcyclopentadienyl) zirconium diiodide, ethylene-bis(tetrahydroindenyl) zirconium diiodide, ethylene-bis(indenyl) zirconium diiodide, ethylene-bis(methylindenyl) zirconium diiodide, ethylene-bis(ethylindenyl) zirconium diiodide, ethylene-bis(methyl,ethylindenyl) zirconium diiodide, ethylene-bis(methyl, propylindenyl) zirconium diiodide, ethylene-bis(methyl, butylindenyl) zirconium diiodide, ethylene-bis(propylindenyl) zirconium diiodide, ethylene-bis(butylindenyl) zirconium diiodide, ethylene-bis(isobutylindenyl) zirconium diiodide, and ethylene-bis(phenylindenyl) zirconium diiodide.

In preparing the polyolefin according to the present disclosure through polymerization or copolymerization, the amount of the organometallic compound is not particularly limited, but it is preferable that the central metal concentration of the organometallic compound in the reaction system used for the polymerization ranges from $10^{-8}$ to 10 mol/L., more preferably ranges from $10^{-7}$ to $10^{-2}$ mol/L.

In one embodiment of the present disclosure, the aluminoxane acts as an activator or a co-catalyst and is known to be suitable for olefin polymerization. Not only conventional methyl aluminoxane (MAO) or modified MAO (MMAO) as well as any commercially available aluminoxane may be used. Preferably, the catalyst composition may include one or more aluminoxanes represented by Chemical Formulas 2 to 4 below.

[Chemical Formula 2]

[Chemical Formula 3]

[Chemical Formula 4]

In Chemical Formulas 2, 3 and 4, $R_1$ to $R_4$ are each independently a linear or branched alkyl group having 1 to 10 carbon atoms, X and y are each independently an integer in the range of 1 to 50, and z is an integer in the range of 3 to 50.

In Formulas 2 to 4, most of $R_1$ to $R_4$, for example, 30 to 100 mol % of $R_1$ to $R_4$ is preferably a methyl group, and more preferably, all of $R_1$ to $R_4$ may be a methyl group. In addition, preferably, x, y and z may each independently be an integer in the range of 4 to 30.

As a specific example, as the aluminoxane, a commercially available alkyl aluminoxane may be used. A non-limiting example of the alkyl aluminoxane may be any one or a combination of two or more selected from the group consisting of unlimitedly, methyl aluminoxane, ethyl aluminoxane, butyl aluminoxane, isobutyl aluminoxane, hexyl aluminoxane, octyl aluminoxane, and decyl aluminoxane. In addition, the aluminoxane is marketed in the form of various hydrocarbon solutions. Among them, it is preferable to use an aromatic hydrocarbon solution aluminoxane, and it is more preferable to use an aluminoxane solution dissolved in toluene.

In addition, the catalyst composition according to the present disclosure may be in the form in which an organometallic compound and aluminoxane are supported on a conventional organic or inorganic carrier. Accordingly, the catalyst composition in the present disclosure may exist in the form of a solid powder or a homogeneous solution. Alternatively, the catalyst composition in the present disclosure may be in the form of supported on an organic or inorganic porous carrier or in the form of insoluble particles of the carrier.

As the carrier, porous particles having a stable structure, such as inorganic oxides or inorganic salts, may be used without limitation. Practically useful carriers are inorganic oxides of elements belonging to Groups 2, 3, 4, 5, 13, or 14 of the periodic table, and examples of the carrier include silica, alumina, silica-alumina, and mixtures thereof and also include clay, modified clay, and mixtures thereof. It is more preferable to use silica in the form of spherical particles.

The inorganic oxide carrier must undergo removal of water or hydroxyl groups before the use thereof. The removal of water or hydroxyl groups may be achieved by heat treatment. The heat treatment of the carrier is performed by heating the carrier to a temperature of 150° C. to 800° C. while fluidizing the carrier in a vacuum or nitrogen atmosphere. The carrier may be used in the form of a dried powder. In this case, the average particle size is in the range of about 1 to 250 μm, and preferably 10 to 150 μm, and the surface area is in the range of about 5 to 1200 $m^2/g$ and preferably about 50 to 500 $m^2/g$. The pore volume of the carrier ranges from 0.1 to 5 $cm^3/g$ and preferably from 0.1 to 3.5 $cm^3/g$, and the pore size ranges from about 5 to 50 nm and preferably 7.5 to 35 nm. It is preferred that about 0 to 3 mmol of hydroxyl groups per 1 g of silica are present on the surface of the carrier and more preferably 0.5 to 2.5 mmol of hydroxyl groups are present. The amount of such hydroxyl groups depends on the dehydration or calcination temperature of the carrier.

In the catalyst composition according to the present disclosure, aluminum in the form of the aluminoxane may be included in an amount of 1 to 100,000 moles, preferably 1 to 5,000 moles, and more preferably 1 to 2,500 moles per 1 mole of the organometallic compound. The amount of the carrier used may be appropriately adjusted according to the required characteristics of the catalyst. In general, with respect to 100 parts by weight of the carrier, the loading amount of aluminum (Al) derived from aluminoxane is 5 to 30 parts by weight and preferably 7 to 20 parts by weight, and the loading amount of zirconium derived from the organometallic compound is 0.01 to 2 parts by weight and preferably 0.05 to 1.5 parts by weight.

The catalyst composition may be added in an amount of 0.01 to 5 parts by weight per 100 parts by weight of the total monomers (ethylene+alpha olefin copolymer), more preferably 0.03 to 3 parts by weight, even more preferably 0.05 to 1 part by weight.

Step a) may be performed in a slurry polymerization reactor. In this case, a solvent or olefin itself may be used as a medium. The solvent may be a solution of any one or a solution of a mixture of two or more selected from the group consisting of propane, butane, isobutane, pentane, hexane, octane, decane, dodecane, cyclopentane, methylcyclopentane, cyclohexane, benzene, toluene, xylene, dichloromethane, chloroethane, 1,2-dichloroethane and chlorobenzene.

In addition, an impurity scavenger may be optionally added in addition to the catalyst composition to increase the productivity of the polyolefin according to the present disclosure. As the impurity scavenger, triethyl aluminum or the like may be used.

The molecular weight and molecular weight distribution of the final polymer prepared according to the method of the present disclosure can be controlled by changing the polymerization temperature or by changing the hydrogen concentration in the reactor.

In the polymerization or copolymerization of olefins according to the present disclosure, the polymerization temperature is not particularly limited because it may change depending on reactants, reaction conditions, etc., but, for example, the polymerization temperature in step a) may range from 0° C. to 120° C. and preferably from 20° C. to 80° C. In addition, the polymerization pressure may range from the atmospheric pressure to 500 $kgf/cm^2$, preferably from atmospheric pressure to 60 $kgf/cm^2$, and more preferably from 10 to 60 $kgf/cm^2$. The polymerization may be carried out in a batch mode, a semi-continuous mode, or a continuous mode. The polymerization may involve two or more steps having different reaction conditions.

In the polymerization or copolymerization of olefins according to the present disclosure, the hydrogen concentration supplied to the slurry polymerization reactor may vary depending on the target molecular weight and molecular weight distribution of the polyolefin. As a non-limiting example, the hydrogen may be added in an amount of 0.001 to 1 part by weight, more preferably 0.01 to 0.5 parts by weight, and even more preferably 0.03 to 0.1 parts by weight, per 100 parts by weight of the total monomers (ethylene alpha olefin copolymer).

Next, in step b), a main polymerization composition composed of the pre-polymer, the ethylene monomer, and the alpha olefin monomer having 3 or more carbon atoms is supplied to a gas phase reactor and is polymerized into a polyolefin polymer.

As such, since the main polymerization is carried out in the gas phase reactor after the pre-polymerization is carried in the slurry polymerization reactor, a polyolefin resin having a wide molecular weight distribution can be obtained. Specifically, the polyolefin resin may satisfy Requirements (i) to (vii) described above. To avoid redundancy, the same description will be omitted.

The main polymerization composition may include the pre-polymer, the ethylene monomer, and the alpha olefin monomer having 3 or more carbon atoms. The amount of each component may be diversely changed depending on the required physical properties of the alpha olefin polymer to be finally obtained. Specifically, the finally obtained polyolefin may contain 1% to 5% by weight of units derived from the pre-polymer, 80% to 99% by weight of units derived from the ethylene monomers, and 0% to 15% by weight of units derived from the alpha olefin monomers having 3 or more carbon atoms, with respect to the total weight of the polyolefin polymer. More preferably, the obtained polyolefin may contain 2% to 5% by weight of units derived from the pre-polymer, 83% to 97% by weight of units derived from the ethylene monomers, and 1% to 12% by weight of units derived from the alpha olefin monomers having 3 or more carbon atoms.

In addition, the molecular weight and molecular weight distribution of the obtained polymer prepared according to the method of the present disclosure can be controlled by changing the polymerization temperature or by changing the hydrogen concentration in the reactor.

In the polymerization or copolymerization of olefins according to the present disclosure, the polymerization temperature is not particularly limited because it may change depending on reactants, reaction conditions, etc., but, for example, the polymerization temperature in step b) may range from 0° C. to 120° C. and preferably from 20° C. to 110° C. In addition, the polymerization pressure may range from the atmospheric pressure to 500 kgf/cm², preferably from atmospheric pressure to 60 kgf/cm², and more preferably from 10 to 60 kgf/cm². The polymerization may be carried out in a batch mode, a semi-continuous mode, or a continuous mode. The polymerization may involve two or more steps having different reaction conditions.

In the polymerization or copolymerization of olefins according to the present disclosure, the hydrogen concentration supplied to the gas phase reactor may vary depending on the target molecular weight and molecular weight distribution of the polyolefin to be obtained. As a non-limiting example, the concentration of the hydrogen may range from 10 to 1000 ppm, more preferably from 30 to 500 ppm, and even more preferably from 50 to 300 ppm.

Hereinafter, the polyolefin resin and preparation method thereof according to the present disclosure will be described in detail with reference to examples. However, the examples described above are presented only for illustrative purposes and are intended to limit the present disclosure. The present disclosure can be embodied in other forms in addition to the forms presented by the examples.

In addition, unless otherwise defined, all technical and scientific terms have the same meaning as that is generally understood by the ordinarily skilled in the art to which the present disclosure pertains. The terms used in the description of the specification of the present application are only intended to effectively describe specific examples and are not intended to limit the present disclosure. The units of the amounts of additives, which are not specifically stated herein, may be % by weight.

[Method of Characterization]

(1) Melt flow index (MIE, MI2.16) was measured according to ASTM D1238 at 190° C. and a load of 2.16 kg.

(2) High load melt flow index (MIF, MI21.6) was measured according to ASTM D1238 at 190° C. and a load of 21.6 kg.

(3) Melt flow index ratio (SR, MFRR) was calculated as MIF/MIE (F/E).

(4) Density was measured by the density gradient pipe method according to ASTM D1505.

(5) Molecular weight and molecular weight distribution: Refractive index detector (RI Detector) equipped with gel permeation chromatography-RI (GPC-RI, Polymer Laboratory Inc., 220 System) was used for measurement. Two Olexis columns and one Guard column were used as separation columns, and the column temperature was maintained at 160° C. Calibration was performed using a standard polystyrene set available from Polymer Laboratory Inc. 27 Minutes of measurement was performed under conditions in which trichlorobenzene containing 0.0125% by weight of antioxidant (BHT) was used as the eluent, the sample concentration was 1.0 mg/ml, the injection amount was 0.2 ml, and the pump flow rate was 1.0 ml/min. Universal calibration was performed for the number average molecular weight (Mn), weight average molecular weight (Mw), and Z-average molecular weight (Mz), with the use of Easical A and Easical B (manufactured by Agilent), which are polystyrene standard materials, and the molecular weights were calculated by conversion into polyethylene.

(6) Tear strength (Elmendorf Tear, MD/TD) was measured by ASTM D-1922.

(7) Depart falling impact strength was by ASTM D1709.

(8) Haze was by ASTM D1003.

(9) Melt tension was measured with Capirograph 1B (manufactured by Toyoseiki Seisaku-sho, Ltd.) according to a method described below. Using a capillary tube having a length of 10 mm and a diameter of 1.0 mm, 5 to 10 g of each pellet sample was measured under conditions in which the measurement temperature was 230° C., the speed was 10 mm/min, and the draw speed was 30 m/min. The average value was obtained by measuring three times per sample.

(10) Surface roughness (Ra): Analysis was performed with a 3D-profiler (Model No. VK-X100, manufactured by Keyence Corporation) through a 1000-fold magnification lens and images of the surface of the samples were obtained. The degree of the roughness was expressed by an Ra (arithmetic mean roughness) value.

(11) Zero share viscosity)($n^0$): Anton Paar's mcr-702 equipment was used. Measurement was performed under conditions in which a parallel plate was used, the diameter was 25 mm, the temperature was 190° C., and the strain 5% was 0.1 to 100 rad/s.

(12) Long chain branching (LCB): Janzen-Colby Plot was used (refer to Ournal of Molecular Structure Vol. 485-486 (1999), 569-584); The Journal of Physical Chemistry Vol. 84(1980) 649); Macromolecules Vol. 43 (2010) 8836-8852). The molecular weight measured by the gel permeation chromatography and the zero share viscosity were used. The LCB was expressed as the number of long-chain branches per 1,000,000 carbons (LCB/$10^6$ carbons).

Preparation of Catalyst Composition

Preparation Example 1

As described in Table 1 below, silica ($SiO_2$, PD18048, PQ Co.) and methyl aluminoxane (MAO, Albermarle Co., 20 wt % in toluene) both of which were calcined at 250° C. under a nitrogen atmosphere were added to a 250-mL flask and ultrasonic waves were applied thereto at 60° C. for 3 hours to obtain a reaction solution A.

Separately from the reaction solution A, racemic-dimethylsilyl-bis(tetrahydroindenyl)zirconium dichloride (Lanxess AG) and MAO (Albemarle Corp., 20 wt % toluene solution) were added as an organometallic compound to a 50-mL flask, and stirred at room temperature for 1 hour to prepare a reaction solution B.

Next, the reaction solution B was added to the reaction solution A, ultrasonic waves were applied to the mixture for 2 hours, and the supernatant was removed. The remaining solid particles were washed twice with hexane and then vacuum dried to prepare a supported catalyst of freely flowing solid powder. The supported catalyst had an aluminum content of 14.6 wt % and a zirconium content of 0.28 wt %.

Preparation Example 2

A large amount of catalyst composition was prepared for use in a commercial process by using a large production reactor. A catalyst composition was prepared in the same manner as in Preparation Example 1 as described in Table 1 below, except that a 300-L reactor with a stirrer and a separate filter dryer were used. The supported catalyst had an aluminum content of 14.8 wt % and a zirconium content of 0.28 wt %.

TABLE 1

| Classification | Reaction solution | | | Supported catalyst (wt %) | |
| --- | --- | --- | --- | --- | --- |
| | Organometallic compound | MAO | Silica | Al | Zr |
| Preparation Example 1 | 47.2 mg | 7.6 g | 2 g | 14.6 | 0.28 |
| Preparation Example 2 | 749 g | 76.5 kg | 25 kg | 14.8 | 0.28 |

[Linear Low Density Polyethylene Copolymer (LLDPE) Preparation and Evaluation Thereof]

Examples 1 to 3 and Comparison Example 1

Using the catalyst composition prepared in Preparation Example 2, polymerization was performed in a continuous gas phase fluidized bed reactor in which one slurry polymerization-type pre-polymerization reactor and a gas phase reactor having a diameter of 60 cm were connected in series. The fluidized bed consisted of granules of polymer particles. Liquid 1-hexene and gaseous ethylene and hydrogen were mixed together in a pipe and the mixture was injected into a reactor recycle gas line. The composition of the injected mixture and the physical properties of the resulting LLDPE resin are shown in Table 2 below. In the gas phase reactor, the injection concentrations of the ethylene, the hydrogen, and the 1-hexene were controlled to maintain the composition shown in Table 2, and the flow rate of the hydrogen was controlled to maintain a constant molar ratio of the hydrogen and the ethylene. In addition, the pre-polymer was supplied to be about 2% to 5% by weight of the total weight of the main polymerization composition (pre-polymer+ethylene+1-hexene). Among the component concentrations of the gas phase reactor in Table 2 below, the mol % of the remainder except for the ethylene, the hydrogen, and the 1-hexene is propane serving as a diluent. The concentrations of all gases were determined by online gas chromatography of the gases in the recycle gas stream. The pre-polymerization reactor and the gas phase reactor used propane as a diluent, and the copolymer of ethylene and 1-hexene, produced by the catalytic reaction, was continuously discharged to maintain a constant level of the fluidized bed in the gas phase reactor. In order to keep the operating temperature constant, the heat generated by the polymerization reaction was controlled by using a heat exchanger. Thus, the temperature of the circulating gas was controlled.

TABLE 2

| | Classification | Example 1 | Example 2 | Example 3 | Comparative Example 1 |
| --- | --- | --- | --- | --- | --- |
| Pre-polymerization Reactor | Catalyst Feed Rate (g/h) | 15 | 15 | 15 | 15 |
| | Temperature of reactor (° C.) | 46 | 46 | 46 | 46 |
| | Pressure of Reactor (K/G) | 20.3 | 20.3 | 20.3 | 20.3 |
| | Ethylene feed rate (kg/h) | 3 | 3 | 2.5 | 2.7 |
| | Hydrogen feed rate (g/h) | 0.22 | 0.22 | 0.14 | 0.16 |
| | 1-hexene feed rate (kg/h) | 0.38 | 0.38 | 0.36 | 0.35 |
| | Retention time (min) | 115 | 115 | 115 | 115 |
| | MIE (g/10 min) | 0.8 | 0.8 | 1.97 | 1.1 |
| | SR(F/E) | 45.4 | 44.3 | 42.0 | 44.0 |
| | Density (D) (g/cm$^3$) | 0.9329 | 0.9319 | 0.9411 | 0.9370 |
| Gas phase reactor | Temperature of reactor (° C.) | 77 | 77 | 80 | 80 |
| | Pressure of Reactor (K/G) | 20 | 20 | 20 | 20 |
| | Ethylene concentration (mol %) | 12.1 | 28 | 28.6 | 28.1 |
| | 1-hexene concentration (mol %) | 0.009 | 0.008 | 0.0043 | 0.0012 |
| | Hydrogen concentration (ppm) | 160 | 184 | 292 | 222 |
| | Retention time (min) | 190 | 190 | 190 | 190 |
| | MIE (g/10 min) | 0.35 | 0.55 | 0.66 | 0.56 |
| | SR(F/E) | 50 | 44 | 44.5 | 44.3 |
| | Density (D)(g/cm$^3$) | 0.9154 | 0.9165 | 0.9305 | 0.9399 |
| | Mw (g/mol) | 120,170 | 108,363 | 105,038 | 110,932 |
| | Mw/Mn | 3.74 | 3.46 | 3.9 | 4.3 |
| | Mz/Mw | 2.41 | 2.30 | 2.5 | 2.5 |

Comparative Examples 2 to 3

An LLDPE resin was prepared in a slurry polymerization reactor, using the catalyst composition prepared in Preparation Example 1. For polymerization temperature control, a 2 L-stainless steel autoclave reactor equipped with a jacket capable of supplying external cooling water was purged 10 times with nitrogen at room temperature, and the temperature was raised to 78° C. Next, nitrogen purging was performed 10 times again. Finally, the feed line and the reactor were purged using 400 ml of isobutane and 10 bar of ethylene. After adjusting the reactor temperature to 70° C., 0.6 to 1.5 ml of 0.2 M triethylaluminum, 2.5 ml (1.1 mmol in hexane) of an antistatic agent (Statsafe 6000, manufactured by Innospec Inc.) and 1 L of isobutane were added to the reactor. After ethylene and 1-hexene were added, the supported catalyst was added to the reactor. The polymerization conditions and the measured physical properties of the obtained LLDPE resins are summarized in Table 3 below. Ethylene partial pressure, the amount (wt %) of 1-hexene (i.e., the input amount of 1-hexene with respect to the input amount of ethylene), and the amount (mg) of hydrogen (mg/kgC2, the input amount of hydrogen per 1 kg of ethylene 1 kg) are shown. After the determined amounts of the components were added, the polymerization was carried out at predetermined temperatures while maintaining the total pressure of the reactor. The partial pressure of the ethylene was maintained constant during the polymerization, and the 1-hexene and the hydrogen were continuously introduced in conjunction with ethylene. After the polymerization was completed, unreacted 1-hexene and isobutane were discharged, and the reactor was opened to recover a free-flowing copolymer.

TABLE 3

| Classification | Comparative Example 2 | Comparative Example 3 |
|---|---|---|
| Amount of catalyst (g) | 0.1 | 0.1 |
| 0.2M TEAL (ml) | 0.8 | 0.8 |
| Polymerization temperature (° C.) | 75 | 75 |
| Polymerization time (min) | 120 | 120 |
| Ethylene (psig) | 130 | 130 |
| Initial addition of 1-hexene (ml) | 24 | 24 |
| 1-hexene (wt %) | 10 | 10 |
| Hydrogen (ppm) | 80 | 100 |
| Activity (g/gcat-hr) | 2730 | 2470 |
| MIE (g/10 min) | 0.47 | 0.41 |
| SR(F/E) | 35.3 | 35.0 |
| Density (D)(g/cm$^3$) | 0.9172 | 0.9159 |
| Mw (g/mol) | 115,583 | 121,394 |
| Mw/Mn | 3.59 | 3.14 |
| Mz/Mw | 2.45 | 2.23 |

Comparative Examples 4 to 6

Comparative Examples 4 and 5 are copolymers prepared in the UNIPOL process used by Exxon Mobile Corp. and prepared using a gas phase reactor without a slurry reactor. Comparative Example 6 is a copolymer prepared using the same process as in Examples 1 to 3. Table 4 below shows the physical properties of the ethylene/hexene copolymers (trade names: XP6026ML, XP6056ML, XP9200EN) of Comparative Examples 4 to 6.

TABLE 4

| Classification | Comparative Example 4 | Comparative Example 5 | Comparative Example 6 |
|---|---|---|---|
| MIE (g/10 min) | 0.2 | 0.5 | 1.0 |
| SR(F/E) | 45.5 | 37.7 | 16.8 |
| Density (D) (g/cm$^3$) | 0.916 | 0.916 | 0.919 |
| Mw (g/mol) | 133,871 | 108,330 | 111,714 |
| Mw/Mn | 2.90 | 2.93 | 2.58 |
| Mz/Mw | 2.27 | 2.14 | 1.95 |

[Preparation of Pellets]

In order to evaluate the blown film performance of the samples of Examples 1 to 3 and Comparative Examples 1 to 6, 500 ppmw of a primary antioxidant (product name: 1010, manufacturer: Songwon Industrial Co., Ltd), 1,000 ppmw of a secondary antioxidant (product name: 168, manufacturer: Songwon Industrial Co., Ltd), and 500 ppmw of a polymer processing aid (PPA; product name: PA450, manufacturer: Hannanotech Co., Ltd.) were added and then put into a twin-screw extruder (type: 814 30 2, model name: 911436). At a processing temperature 200° C. and a screw rotation speed of 60 rpm, a melt blend was prepared and then pelletized using a pelletizer.

[Preparation of LLDPE Blown Film]

[Preparation of Simple Film]

For simple film production, the polyolefin copolymer pellets of Examples 1 to 3 and Comparative Examples 1 to 6 were put into a blown film extruder (model name: LLD Blown Film M/C 40, manufacturer: Duk young Tech Co., Ltd.) and processed into a film having a thickness of 30 μm. The processing was performed under a temperature of 180° C., a screw diameter of 40 mm, a screw rotation speed of 90 rpm, a blow-up ratio (BUR) of 2.5/39.3 cm, and a die lip diameter of 100 mm.

TABLE 5

| Classification | Example 1 | Example 2 | Example 3 |
|---|---|---|---|
| Film thickness (μm) | 30 | 30 | 30 |
| MIE (g/10 min) | 0.35 | 0.55 | 0.66 |
| SR(F/E) | 50 | 44 | 44.5 |
| Resin melt pressure (bar) | 200 | 170 | 199 |
| Depart falling impact strength(B) (g) | 1230 | 1179 | 234 |
| Tear strength (MD/TD) (g · f/30 μm) | 144/486 | 188/493 | 187/792 |
| Equation 1: | 134 | 149 | 139 |
| Haze (%) | 10.6 | 8.2 | 12.5 |
| n° (mPa-s) | 1.17E+13 | 9.57E+09 | 8.03E+08 |
| Long chain branching (LCB/10$^6$ carbon atoms) | 99.09 | 54.17 | 21.93 |
| Melt tenison (g) | 2.16 | 1.7 | 1.6 |

TABLE 6

| Classification | Comparative Example | | | | | |
| --- | --- | --- | --- | --- | --- | --- |
| | 1 | 2 | 3 | 4 | 5 | 6 |
| Film thickness (μm) | 30 | 30 | 30 | 30 | 30 | 30 |
| MIE (g/10 min) | 0.56 | 0.47 | 0.41 | 0.2 | 0.50 | 1.0 |
| SR(F/E) | 44.3 | 35.3 | 35.0 | 45.5 | 37.7 | 16.8 |
| Resin melt pressure (bar) | 213 | 139 | 188 | 268 | 185 | 294 |
| Depart falling impact strength (B)(g) | 139 | 770 | 1160 | 1314 | 1209 | 635 |
| Tear strength (MD/TD) (g · f/30 μm) | 56/417 | 127/265 | 159/268 | 38/375 | 120/439 | 287/425 |
| Equation 1: | 135 | 197 | 200 | 144 | 180 | 654 |
| Haze (%) | 17.3 | 9.3 | 7.6 | 14.2 | 7.4 | 8.3 |
| n° (mPa-s) | 2.21E+11 | 6.32E+09 | 4.41E+09 | 1.43E+12 | 9.13E+08 | 6.91E+06 |
| Long chain branching (LCB/$10^6$ carbon atoms) | 99.09 | 33.7 | 27.7 | 99.09 | 23.76 | 0 |
| Melt tension (g) | — | — | — | 3.63 | 2.22 | — |

Figure 1:
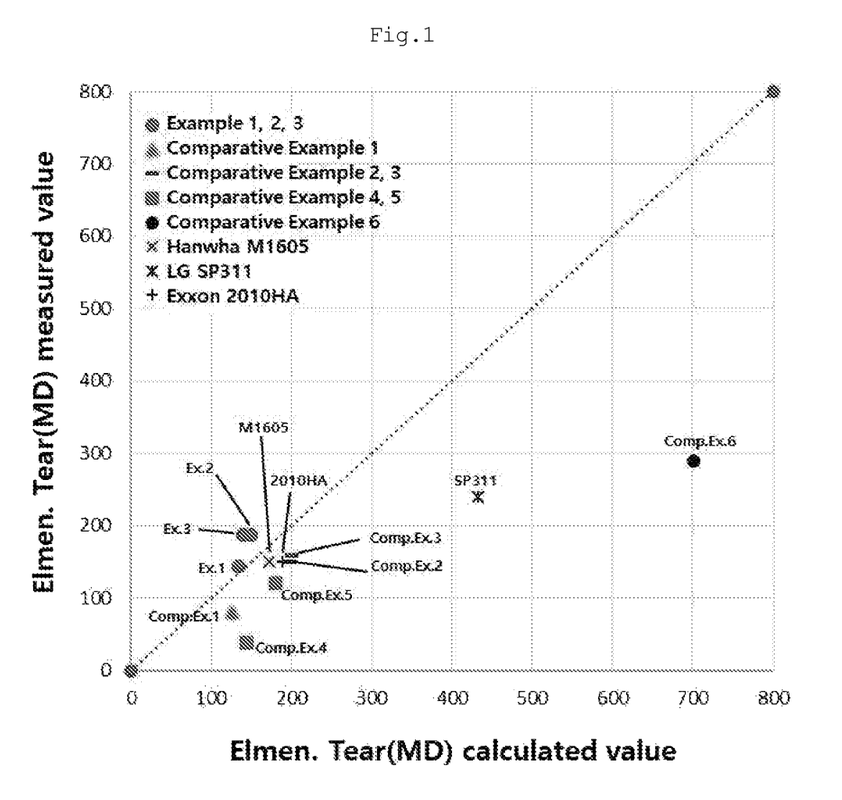
FIG. 1 is a plot diagram in which the horizontal axis indicates calculation values calculated by Relational Equation 1 for the tear strength in the machine direction for Examples of the disclosure, Comparative Examples, and commercially available products, and the vertical axis indicates measurement values of the tear strength in the machine direction of a blow-molded film.
Figure 2:
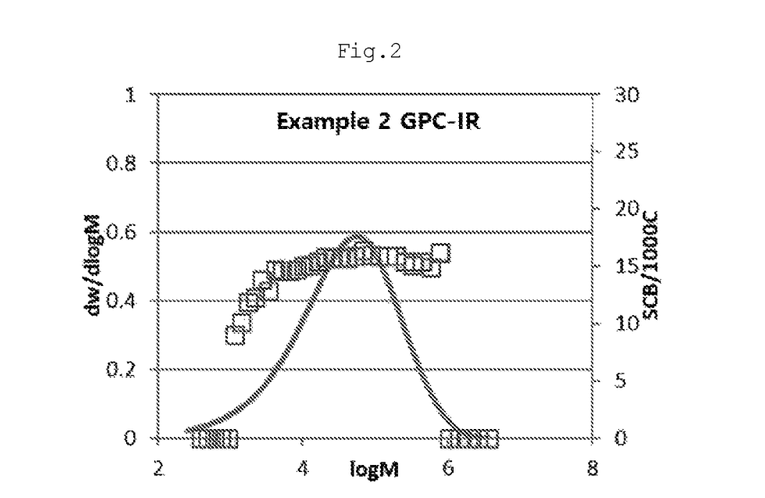
FIG. 2 is a gel permeation chromatography (GPC-IR) measurement result of Example 2.
Figure 3:
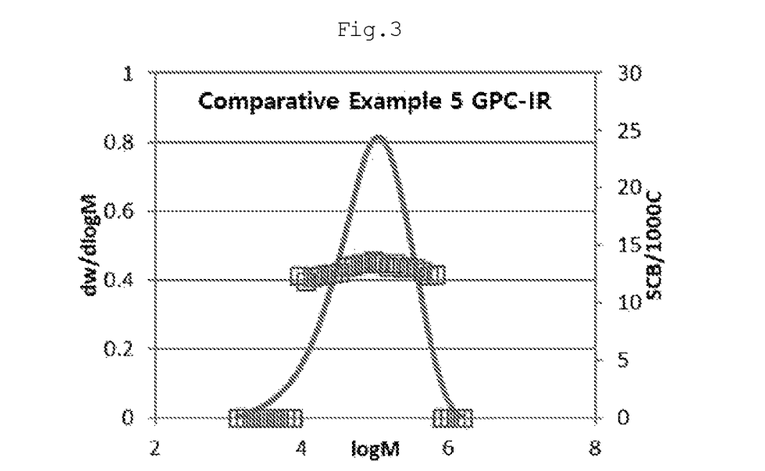
FIG. 3 is a gel permeation chromatography (GPC-IR) measurement result of Comparative Example 5.

Referring to Tables 2 to 6, LLDPE films of Examples 1 to 3 were prepared using the LLDPE resins satisfying the conditions in which the density (D) ranges from 0.900 to 0.936 g/cm$^3$, the melt flow index (MIE) ranges from 0.1 to 2.0 g/10 min, the high load melt flow index (MIF) ranges from 17 to 100 g/10 min, the melt flow index ratio (SR) ranges from 35 to 55, the ratio (Mw/Mn) of the weight average molecular weight (Mw) to the number average molecular weight (Mn) ranges from 3.0 to 5.0, and the ratio (Mz/Mw) of the Z-average molecular weight (Mz) to the weight average molecular weight (Mw) ranges from 2.0 to 3.5. In the case of the LLDPE films, the measured tear strength values in the machine direction (MD) were greater than the values calculated by Equation 1

$$\left(\frac{1}{\text{EXP}(0.102 \times SR)} \times 3000 + \text{EXP}\left(\frac{4.35}{D}\right)\right).$$

This is because the polyolefin resins change to have random orientation during the polymer melt process, and the chains become oriented in various directions aside from the machine direction. Such orientation prevents cracks from proceeding in the mechanical direction, resulting in improvement in tear strength (MD) in the machine direction.

Example 4 in which the MIF was less than 17 and the Mw/Mn ratio was less than 3, the resin of Comparative Example 5 in which the Mw/Mn is was less than 3, and the resin of Comparative Example 6 in which the MIF was less than 17, the SR was less than 35, the Mw/Mn ratio was less than 3, and the Mz/Mw ratio was less than 2, the measured tear strength (MD) values in the machine direction were smaller than the values calculated by Equation 1.

As such, it was confirmed that when the blown film was manufactured with the LLDPE resin satisfying the requirements presented in the present disclosure, the tear strength (MD) in the machine direction was increased, resulting in improvement in toughness.

[Preparation of Blend Film]

Blend films was prepared by mixing 70 wt % of the polyolefin copolymer pellets of each of Examples 1 and 2 and Comparative Examples 4 and 5 and 30 wt % of a low-density polyethylene product (LD2420d) produced by PTT Chemical. The mixture was put into a blown film extruder controlled to have the same conditions as in the simple film preparation method. Thus, blend films were obtained. The characterization results are shown in Table 7 below.

TABLE 7

| Classification | | Example 1-1 | Example 2-1 | Comparative Example 4-1 | Comparative Example 5-1 |
| --- | --- | --- | --- | --- | --- |
| Film thickness (μm) | | 30 | 30 | 30 | 30 |
| Blend Evaluation of film | Resin melt pressure (bar) | 205 | 174 | 261 | 213 |
| | Depart falling impact strength (A) (g) | 659 | 634 | 469 | 484 |
| | Tear strength (MD/TD) (g) | 72/634 | 91/658 | 30/508 | 67/624 |
| | Haze (%) | 12.5 | 10.7 | 15.3 | 10.9 |

On the other hand, in the cases of the LLDPE films of Comparative Examples 1 to 6 made from the resin of Comparative Example 1 in which the density was out of the above range, the resins of Comparative Examples 2 and 3 in which the MIF was less than 17, the resin of Comparative As such, processability can be improved by blending the LLDPE resin proposed in the present disclosure with other LDPE resins.

The present disclosure has been described with reference to some specific examples and characters. However, the specific examples and characteristics are only for illustrative purposes and are intended to limit the scope of the present disclosure, and it will be appreciated that various modifications and changes are possible from the above description by those skilled in the art to which the present disclosure pertains.

Therefore, the spirit of the present disclosure is not limited to the specific examples described above, and all forms defined by the appended claims and all equivalents and modifications thereto fall within the scope of the present disclosure.

What is claimed is:

1. A polyolefin resin satisfying the following requirements (i) to (vii):
   (i) a density (D) measured by a density gradient pipe method according to ASTM D1505 ranges from 0.900 to 0.936 g/cm³;
   (ii) a melt flow index (MIE) measured according to ASTM D1238 (190° C., 2.16 kg) ranges from 0.1 to 2.0 g/10 minutes;
   (iii) a high load melt flow index (MIF) measured according to ASTM D1238 (190° C., 21.6 kg) ranges from 17 to 100 g/10 minutes;
   (iv) a melt flow rate ratio (SR, MIF/MIE) ranges from 35 to 55;
   (v) a ratio (Mw/Mn) of a weight average molecular weight (Mw) to a number average molecular weight (Mn) measured by gel permeation chromatography ranges from 3.0 to 5.0;
   (vi) a ratio (Mz/Mw) of a Z-average molecular weight (Mz) to a weight average molecular weight (Mw) measured by gel permeation chromatography ranges from 2.0 to 3.5; and
   (vii) a tear strength (MD, g) in a machine direction of a film produced by blowing the polyolefin resin to a thickness of 30 μm at an expansion ratio (BUR) of 2.5 satisfies Relational Expression 1 below.

$$MD > \frac{1}{EXP(0.102 \times SR)} \times 3000 + EXP\left(\frac{4.35}{D}\right).\quad \text{[Relation Equation 1]}$$

2. A polyolefin film made from the polyolefin resin of claim 1.

3. A method of preparing a polyolefin resin, the method comprising:
   a) synthesizing a pre-polymer in a slurry polymerization reactor by pre-polymerization of a pre-polymerization composition comprising an ethylene monomer, an alpha olefin monomer having 3 or more carbon atoms, and a catalyst composition; and
   b) synthesizing a polyolefin polymer by polymerizing supplied a main polymerization composition comprising the pre-polymer, an ethylene monomer, and an alpha olefin monomer having three or more carbon atoms to a gas phase reactor,
   wherein the polyolefin polymer satisfies the requirements (i) to (vii) recited in claim 1.

4. The method according to claim 3, wherein the pre-polymerization composition comprises 80% to 99.9% by weight of the ethylene monomer and 0.1% to 20% by weight of the alpha olefin monomer having 3 or more carbon atoms, with respect to the total amount of the monomers.

5. The method according to claim 3, wherein the catalyst composition comprises one or more organometallic compound represented by Chemical Formula 1 below

[Chemical Formula 1]

wherein in Chemical Formula 1,
M is zirconium Zr,
$L_1$ and $L_2$ are each independently cyclopentadienyl, indenyl, tetrahydroindenyl or fluordenyl,
T is Al, Si, Sn, or a hydrocarbon group having 1 to 4 carbon atoms,
$X_1$ and $X_2$ are each independently a halogen or a hydrocarbon group having 1 to 10 carbon atoms, and
$L_1$, $L_2$, and T are each independently unsubstituted or further substituted with hydrogen, halogen, hydrocarbyl having 1 to 20 carbon atoms, alkoxy having 1 to 20 carbon atoms, or any combination thereof, in which substituents adjacent to each other are each independently linked to $L_1$ and $L_2$, thereby forming a fused ring structure.

6. The method according to claim 3, wherein the catalyst composition comprises one or more aluminoxanes represented by Chemical Formulas 2 to 4 below

[Chemical Formula 2]

[Chemical Formula 3]

[Chemical Formula 4]

wherein in Chemical Formulas 2, 3, and 4,
$R_1$ to $R_4$ each independently are a liner or branched alkyl group having 1 to 10 carbon atoms,
X and y each independently are integers in the range of 1 to 50, and
z is an integer in the range of 3 to 50.

7. The method according to claim 5,
wherein the catalyst composition comprises 1 to 100,000 moles of the aluminoxane per 1 mole of the organometallic compound.

8. The method according to claim 5, wherein the catalyst composition is in a form in which the organometallic compound and the aluminoxane are supported on a carrier, and the carrier is made of a material selected from the group consisting of silica, alumina, silica-alumina, clay, modified clay, and mixtures thereof.

9. The method according to claim 8, wherein the catalyst composition comprises 5 to 30 parts by weight of aluminum derived from the aluminoxane compound and 0.01 to 1 part by weight of zirconium derived from the organometallic compound, per 100 parts by weight of the carrier.

10. The method according to claim 9, wherein the catalyst composition comprises 10 to 20 parts by weight of aluminum derived from the aluminoxane compound and 0.1 to 0.7 part by weight of zirconium derived from the organometallic compound, per 100 parts by weight of the carrier.

* * * * *